United States Patent

Nomura et al.

[11] Patent Number: 5,636,064
[45] Date of Patent: Jun. 3, 1997

[54] ZOOM LENS BARREL WITH FLAT FACED HELICOID THREADING

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 496,959

[22] Filed: Jun. 30, 1995

[30] Foreign Application Priority Data

Jul. 5, 1994 [JP] Japan ................. 6-176000

[51] Int. Cl.$^6$ ........................ G02B 15/14
[52] U.S. Cl. ........................ 359/704; 359/694
[58] Field of Search ................. 359/694, 704, 359/706, 822, 823, 826, 830

[56] References Cited

U.S. PATENT DOCUMENTS

| 4,439,019 | 3/1984 | Muryoi | 359/704 |
|---|---|---|---|
| 4,456,342 | 6/1984 | Muryoi | 359/704 |
| 4,472,031 | 9/1984 | Muryoi | 359/704 |
| 5,052,781 | 10/1991 | Iizuka | 359/823 |
| 5,144,493 | 9/1992 | Nomura | 359/700 |
| 5,164,757 | 11/1992 | Nomura | 354/403 |
| 5,198,932 | 3/1993 | Takamura | 359/694 |
| 5,231,449 | 7/1993 | Nomura | 354/485 |
| 5,245,476 | 9/1993 | Shono | 359/699 |
| 5,262,898 | 11/1993 | Nomura | 359/700 |
| 5,270,868 | 12/1993 | Nomura | 359/700 |
| 5,327,184 | 7/1994 | Nomura et al. | 354/195.1 |
| 5,349,408 | 9/1994 | Nomura et al. | 354/195.1 |
| 5,349,475 | 9/1994 | Nomura | 359/694 |
| 5,386,740 | 2/1995 | Nomura et al. | 74/89.16 |
| 5,467,227 | 11/1995 | Nomura | 359/694 |

*Primary Examiner*—Georgia Y. Epps
*Assistant Examiner*—Ricky Mack
*Attorney, Agent, or Firm*—Greenblum & Bernstein P.L.C.

[57] ABSTRACT

An end surface of external helicoid threads provided on an inner movable barrel and an end surface of a ring member attached to an outer barrel having internal helicoid threads are arranged to be parallel, in order that the ring member does not undergo detaching forces. The ring member is thereby able to resist detachment if the inner barrel is overextended.

17 Claims, 4 Drawing Sheets

ZOOM LENS BARREL WITH FLAT FACED HELICOID THREADING

BACKGROUND OF THE INVENTION

The present invention relates to a zoom lens barrel that contains an inner barrel nested in an outer barrel, and more specifically, to a structure for retaining the inner barrel within the outer barrel.

Zoom lens barrels consisting of one or more telescoping lens barrels is commonly in use in "compact" cameras. "Telescoping", in this context, does not refer to the optical properties of the lenses, but rather to a mechanical structure consisting of parts that fit and slide one within another, in the manner of the tubes of a jointed telescope. The telescoping zoom lens barrel, in order to move an inner barrel along a direction of the optical axis, has internal threads formed on an inner surface of the outer barrel and external threads formed on the outer surface of the inner barrel. The threads are engaged, end one of the inner or outer barrels is rotated relative to the other. This relationship can continue between multiple nested barrels.

For example, the external threads are formed in a narrow band on the camera-body side portion of the inner barrel, while the remainder of the outer surface is a smooth cylindrical surface having no projections. The engagement is between the externally threaded band and inner threads extending over the length of the outer barrel, enabling the smooth cylindrical portion of the inner barrel to extend beyond the outer barrel (telescoping). In some cases, a ring is attached inside the edge of the outer barrel to cover the gap between the outer barrel and the inner barrel. The ring member improves appearance and blocks light at barrel interconnections.

Ideally, the clearance between the last external threads and the ring member is minimized, when the zoom lens barrel is fully telescoped, to achieve the longest possible telescoping extension of the inner barrel. However, when the clearance is very small, or so small that contact between the ring and external thread is possible, detachment of the ring member may occur if the user inadvertently pulls the inner barrel while the zoom lens barrel is fully telescoped. More particularly, a triple-barrel telescoping zoom lens is more likely to suffer a detachment of the ring member than a double-barrel zoom lens, as a triple-barrel lens operates with a longer (i.e., larger) backlash than the double-barrel lens.

SUMMARY OF THE INVENTION

It is therefore an object of the present invention to provide an improved room lens barrel in which the ring member is not detached easily from the outer surface of a barrel member and the overrun of the inner barrel can be prevented when the clearance between the external helicoid threads of the inner surface and the ring member is small.

In order to achieve the objects of the invention, an improved zoom lens barrel includes an outer barrel, an object side of the outer barrel being defined as a side facing an object to be photographed, internal helicoid threading arranged on the inner surface of the outer barrel and an inner barrel. The inner and outer barrels are concentric and sharing an axis. External flat-faced helicoid threading is arranged on an outer surface of the inner barrel, the flat-faced helicoid threading having a flat side face on an object side end thereof. The internal helicoid threading and the external flat-faced helicoid threading are engaged to drive the inner barrel in the direction of the axis towards the object side. A flat-faced ring member is attached within an object side end of the inner surface of the outer barrel, and has an inner flat face parallel to the flat side face on the object side end of the external flat-faced helicoid threading. The inner flat face is in flush contact with the flat side face on the object side end of the external flat-faced helicoid threading when the inner barrel is driven towards the object side.

In this manner, the flat faces of the external helicoid threads are in flush contact with the ring member, and no skewed forces are imparted to the ring member in case the inner barrel is driven or extended far enough to cause contact of the external helicoid threads with the ring member. If the forces are not skewed or angled, the resistance of the ring member to detaching is better. The ring member may therefore better act as a retainer with this construction, and is better able to resist forces from the inner barrel's helicoid threading.

Preferably, the flat side face on the object side end of the flat-faced helicoid threading is formed perpendicular to the axis, and the inner flat face of the flat-faced ring member is formed perpendicular to the axis, so that all contact forces between the inner flat face and the flat side face are in the direction of the axis. In one particular case, the ring member has a groove in the outer circumference to match a ridge provided on the inner circumference of the outer barrel.

In this manner, the resistance of the ring member to detachment is generally improved for most methods of attachment. Furthermore, it is specifically in, improved as the ring member may be snapped into or attached to the outer barrel by means of the ridge, which is able to resist forces in the direction of the axis.

According to a refinement of the invention, a width of the external helicoid becomes narrower approaching the flat side face on the object side end of the external flat-faced helicoid threading. In one particular cage, the width of the external helicoid becomes narrower in a stepped fashion.

The introduction of the flat faces as described can cause interference between the helicoid threads, especially towards the end approaching the flat side faces as sharp corners of the external and internal helicoid threads meet. Using this width variation in combination with the flat faces enables the present invention to concurrently overcome backlash and interference at the end of the moving ranges of the engaged helicoid threads, as well as to resist the detachment of the ring member.

DESCRIPTION OF THE ACCOMPANYING DRAWINGS

DESCRIPTION OF THE EMBODIMENTS

Figure 1:
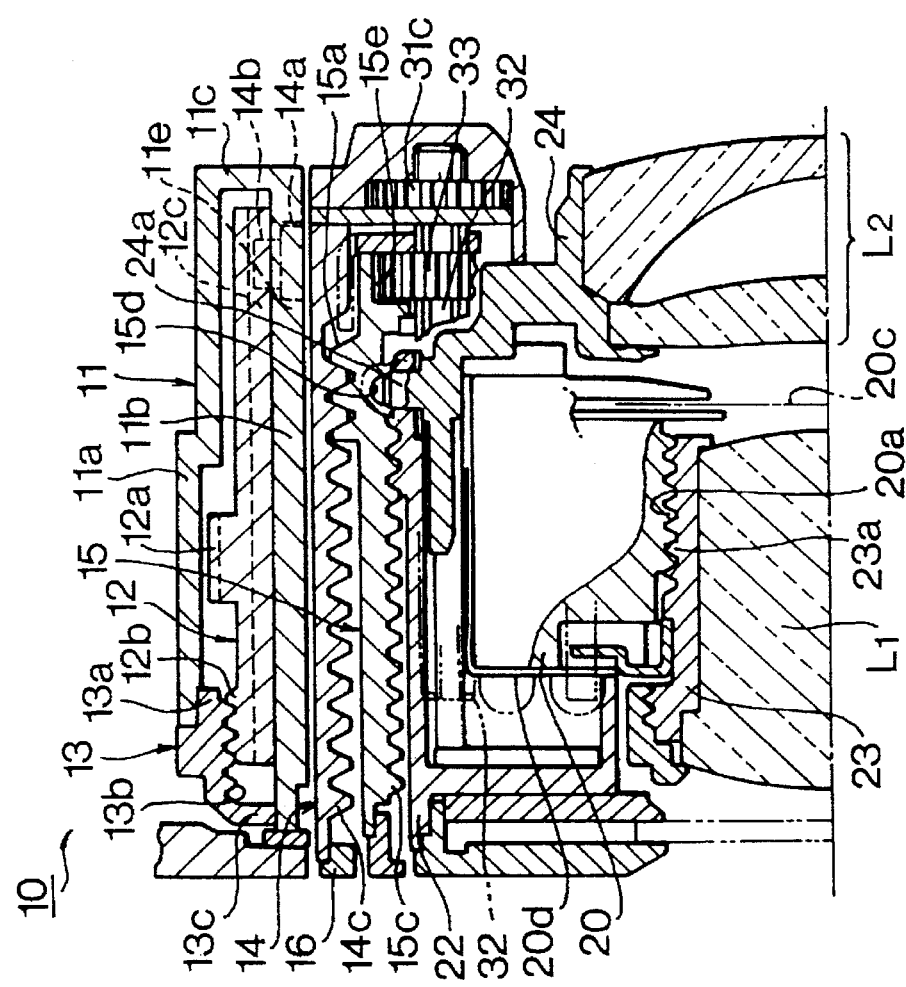
FIG. 1 is an axial cross section of a zoom lens barrel (retracted) employing an embodiment of the invention.
Figure 2:
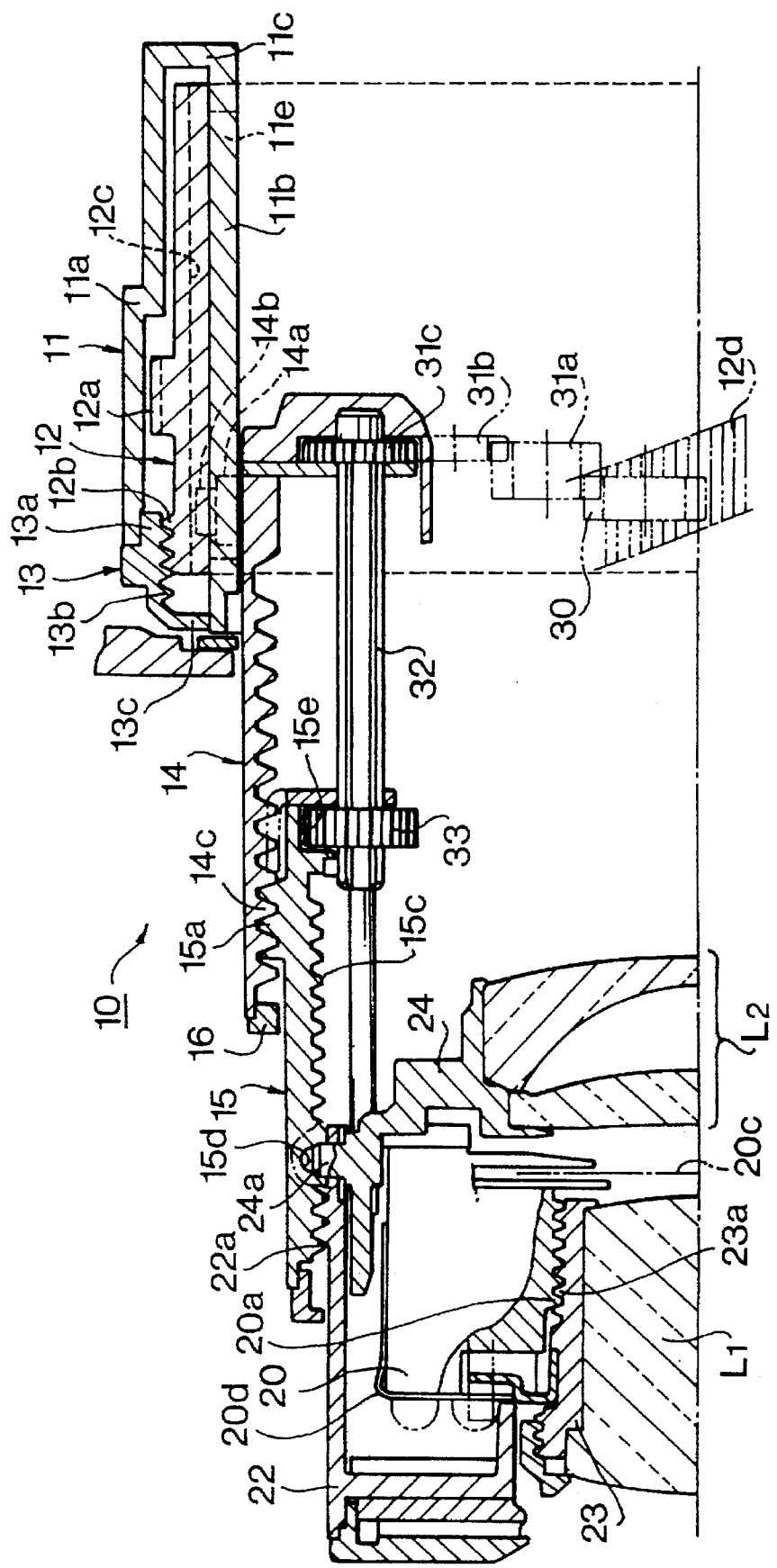
FIG. 2 is an axial cross section of the zoom lens barrel (extended) employing an embodiment of the invention.

As shown in FIGS. 1 and 2, a zoom lens 10 (provided on a camera body, not shown) embodying the invention is a two group zoom lens, having a front lens group L1 and a rear lens group L2. The lens groups L1 and L2 are accommodated in a zoom lens barrel having three movable telescoping barrels.

FIG. 1 and 2 each show axial cross sections. FIG. 1 shows the telescoping barrels fully retracted. FIG. 2 shows the telescoping barrels fully extended.

A lens holding barrel 11, including concentric outer and inner fixed barrels 11a end 11b, is unitarily formed with the camera body (not shown). A gap between the outer and inner fixed barrels 11a and 11b is closed by connecting wall 11c on the image side (right side of FIGS. 1 and 2) of the zoom lens 10. The object side of the gap between the concentric outer and the inner fixed barrels 11a and 11b is not connected, and an opening is formed. A guide groove 11e is formed in the inner fixed barrel, extending in the direction of the optical axis of the zoom lens 10.

A rotatable ring 12 is provided in the gap between the outer and inner fixed barrel 11a and 11b. An inclined inner gear 12d is formed on the inner surface of the rotatable ring 12, and an external ring gear 12a is formed on the outer circumferential surface of the rotatable ring 12. Additionally, a helical cam groove (not shown) is formed on the inner surface of the rotatable ring 12. The opening at the object side of the outer and inner fixed barrels 11a 11b is closed by a support ring 13 screw-mounted to the rotatable ring 12. Threads 12b are formed at the object side end portion of the rotatable ring 12 that engage a screw portion 13b of an engaging portion 13a of the support ring 13. The support ring 13 is rotatable with the rotatable ring 12.

The engagement portion 13a of the support ring 13 engages the inner surface of the outer fixed barrel 11a, the threads 12b of the rotatable ring 12 via the screw portion 13b, and the outer surface of the inner fixed barrel 11b via a contact portion 13c. The support ring 13 is biased towards the lens holding barrel 11 by means of a biasing device (not shown) and the positional relationship of the support ring 13 and the rotatable ring 12 (with respect to the direction of the optical axis of the zoom lens 10) is kept constant.

A first movable barrel 14, movable in the direction of the optical axis of the zoom lens, is provided inside the lens holding barrel 11. A guide projection 14a on the outer surface of the first movable barrel 14 engages the guide groove 11e formed on the lens holding barrel 11. The guide groove 11e guides the guide projection 14a along the direction of the optical axis. A cam pin 14b, provided on the guide projection 14a, engages the helical cam groove (not shown) formed on the inner surface of the rotatable ring 12. With this structure, by rotating the rotatable ring 12, the first movable barrel 14 is both moved along the optical axis via the cam pin 14b and restrained from rotating by the guide projection 14a.

The first movable barrel 14 also carries a rotatable pinion 30, relay gears 31a and 31b, and a rotatable shaft 32 provided with a coaxial gear 31c. The pinion 30, borne by the first movable barrel 14, meshes with the inclined inner gear 12d of the rotatable ring 12. The pinion 30 drives the relay gear 31a, and the rotation is transmitted to the shaft 32 by the relay gear 31a and the coaxial gear 31c.

Furthermore, inner helicoid threads 14c are formed substantially over the entire inner surface of the first movable barrel 14. A second movable barrel 15 is provided within the first movable barrel 14. External helicoid threads 15a are formed in a band (the band having a predetermined width and location) about the outer surface of the second movable barrel 15. The external helicoid threads 15a engage the inner helicoid threads 14c of the first movable barrel 14. The external helicoid thread 15a are positioned on the image side portion of the second movable barrel 15 and sized to remain covered when the second movable barrel 15 is fully extended. In addition, inner helicoid threads 15c are formed substantially over the entire inner surface of the second movable barrel 15, and an inner ring gear 15e is provided on the image side end of the second movable barrel 15. A drive pinion 33, engaging the inner ring gear 15e and moving with the ring gear 15e, is slidably mounted to the shaft 32, carried by the first movable barrel 14, via a spline or the like. The pinion 33 rotates together with the transmission shaft 32, but is slidable along the shaft 32 in the direction of the optical axis. Thus, the pinion 33 moves together with the second movable barrel 15 in the direction of the optical axis.

With this construction, at whatever position the first and the second movable barrels 14, 15 are located, the rotation of the rotatable ring 12 can be transmitted to the second movable barrel 15.

A front lens group holding barrel 22 is provided inside the second movable barrel 15, and a shutter block 20 is provided in the front lens group holding barrel 22. External helicoid threads 22a are formed on the outer circumferential surface of the front lens group holding barrel 22, and engage the inner helicoid threads 15c formed on the inner surface of the second movable barrel 15. The front lens group holding barrel 22 is prevented from rotating by a regulation member (not shown), and as the second movable barrel rotates, the barrel 22 moves in the direction of the optical axis (without rotating).

A front lens frame 23, having external helicoid threads 23a on the outer surface thereof, is also provided inside the front lens holding barrel 22. The front lens frame 23 holds the front lens L1. Inner helicoid threads 20a are formed on the inner surface of the shutter block 20, and engage the external helicoid threads 23a of the front lens frame 23. The shutter block 20 rotates the front lens frame 23 based on focusing data to move the front lens L1 to an in-focus position for a certain object distance. Furthermore, based on exposure data related to the brightness of the object, the shutter block opens and close the shutter blades 20c. Data (focusing and exposure) is transmitted from the camera body to the shutter block 20 through a flexible circuit board 20d.

A rear lens frame 24 holds the rear lens group L2 within the zoom lens 10, and is provided with a cam follower 24a. A cam groove 15d is formed on the inner surface of the second movable barrel 15, and the cam follower 24a on the rear lens frame 24 engaged with the cam groove 15d. The rear lens frame 24 is prevented from rotating by a regulating member (not shown) extending from the camera body. Therefore, as the second movable barrel 15 rotates and moves along the optical axis, the front lens frame 23 moves along the optical axis in response, and the rear lens frame 24 moves along the optical axis (without rotating) in accordance with the shape of the cam groove 15d. By the combination of movement of the lens groups L1 and L2, zooming is effected.

A ring member 16 is attached to the object side end of the first movable barrel 14. The ring member 16 serves several purposes. It prevents over-extension of the second movable barrel 15, it shields the lens interior from ambient light, and it covers the sharp ring edge of the molded barrel 14. In addition, the overall appearance of the zoom lens 10 is improved by the ring member 16. The inner diameter of the ring member 16 is smaller than the outer diameter of the second movable barrel 15 (or the external helicoid threads 15a). The surface of the ring member 16 facing the helicoid threads 15a is perpendicular to the optical axis. The ring member 16 has a square channel groove formed in the outer surface thereof to enable the ring member 16 to be snapped into the first movable barrel 14 at a square ridge on the first movable barrel 14, the ridge having front and rear surfaces perpendicular to the optical axis.

According to the embodiment of the invention, the object side surface of the external helicoid threads 15a is formed to be perpendicular to the optical axis. Therefore, if the second movable barrel 15 is extended far enough such that the object side surface of the external helicoid threads 15a contacts the ring member 16, the object side surface of the external helicoid threads 15a abuts the ring member 16 with flush opposing surfaces. With this construction, if the second movable barrel 15 is moved past a designed maximum extension and presses on the ring member 16, no angled forces to lift and detach the ring member 16 are applied. The ring member 16 is thereby able to restrain the motion of the second movable barrel 15.

Figure 3:
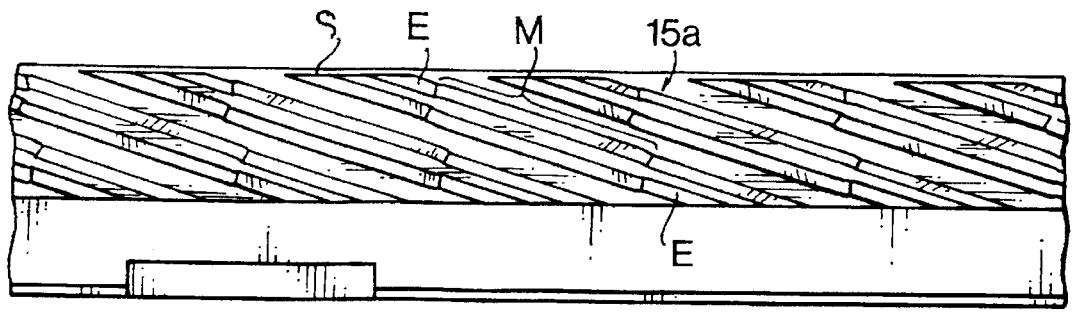
FIG. 3 is a development of the external helicoid threads formed on a second barrel of the zoom lens employing an embodiment of the invention.
Figure 4:
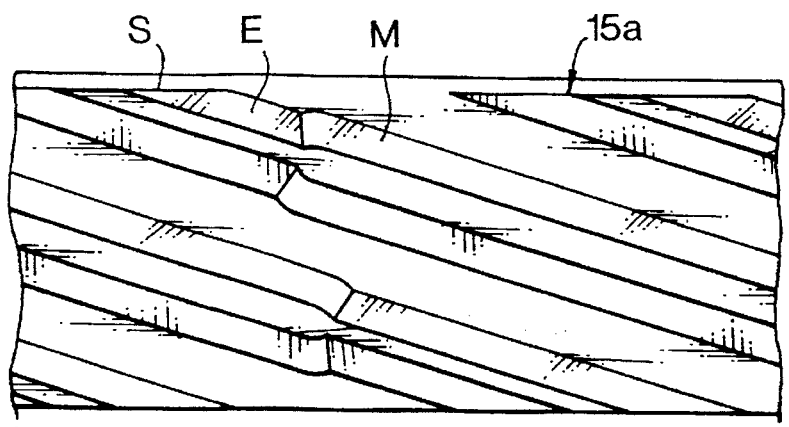
FIG. 4 is an enlarged view of FIG. 3.
Figure 5:
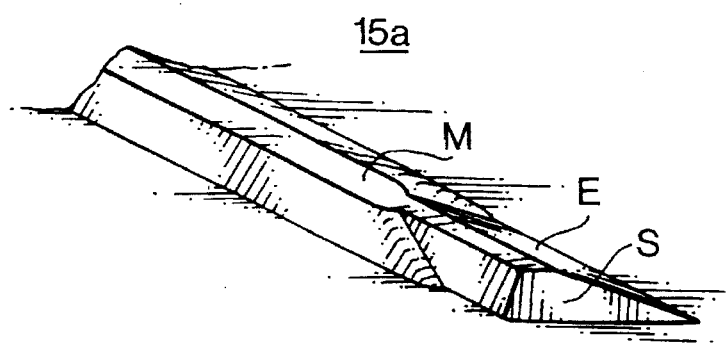
FIG. 5 is a perspective view of an embodiment of an external helicoid thread according to the invention.

FIG. 3 is a developed view of the external helicoid threads 15a, and FIG. 4 shows the external view thereof.

The end surfaces S of the external helicoid threads 15a are formed to be flat-faced to be flush with the ring member 16, and to be perpendicular to the optical axis. The external helicoid threads 15a are equally spaced with each other, and are formed obliquely with respect to the optical axis. The height of each thread 15a is unchanged at any point along the thread. The introduction of the flat faces S can cause interference between the helicoid threads, especially towards the end approaching the flat side faces as sharp corners of the external and internal helicoid threads meet. However, the width of the thread 15a at end portions E is smaller than that at the middle portion M, to ensure that interference between the external helicoid threads 15a and the internal helicoid threads 14c does not occur, especially at the terminal ends of relative travel. Using this width variation in combination with the flat faces enables the present invention to concurrently overcome backlash and interference at the end of the moving ranges of the engaged helicoid threads, as well as resist the detachment of the ring member 16.

In general, each barrel 11, 14, 15, and 22 of the zoom lens 10 is formed of plastic using a metal mold. Grooves of the metal mold to form the external helicoid threads are directly cut by an end mill or a grindstone. Although the direct cutting method is easier than another methods, the cross-sectional shape of the groove is directly resultant from the shape of the end mill or grindstone. An external helicoid thread formed by a solely mill-cut or grindstone-cut metal mold is rounded and tapered at either end, the groove height becoming gradually lower as the mill or grindstone is withdrawn when forming the mold.

The external helicoid threads 15a, according to the embodiment of the invention, are formed using a metal mold that is formed by the direct cutting method at the middle portion, but by an electrical discharge machining method at both end portions to achieve flat-faced end surfaces S to match the ring member 16, which in this case is perpendicular to the optical axis.

Figure 6:
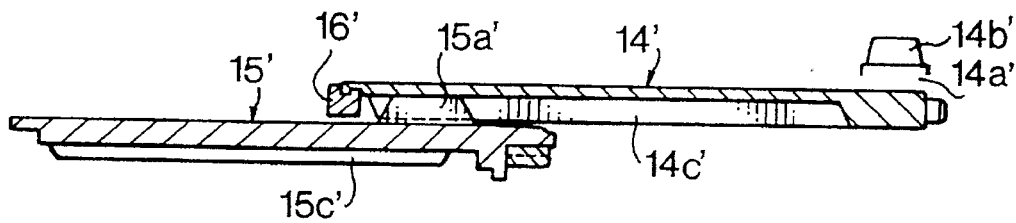
FIG. 6 shows the interaction of conventional external helicoid threads with the ring member as the threads approach the ring, in a conventional lens barrel.
Figure 7:
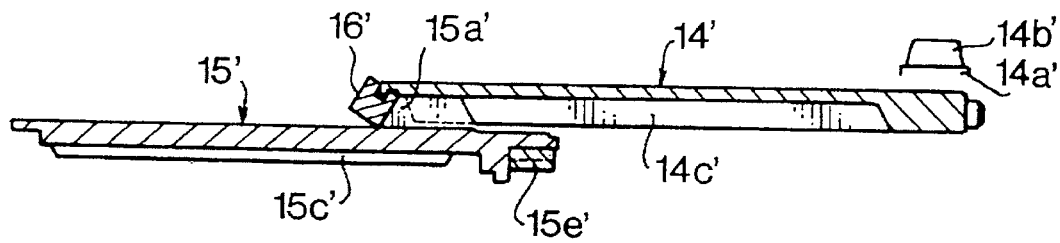
FIG. 7 shows the interaction of the conventional external helicoid threads with the ring member in a contact situation, in a conventional lens barrel.

FIG. 6 shows the relationship between the external helicoid threads 15a and the ring member 16' at the designed maximum extension for a conventional helicoid form, formed using a metal mold cut solely by the direct cutting method. When the camera is electronically controlled, the position of the barrels 14', 15' are controlled such that the inner barrel (second movable barrel 15') stops before it contacts the ring member 16'. However, for example, if photographer inadvertently rotates or pulls the inner barrel (barrel 15'), the ring member 16' may be detached as the ring member 16' is pushed with an angled, non-normal force by the rounded and tapered end portion of the external helicoid threads 15a', twisting the ring member 16'. FIG. 7 shows the case where the second movable barrel 15' overextends the designed maximum extension, and contacts ring member 16'. As shown in FIG. 7, since the height of the end portion of the helicoid threads 15a' gradually decreases (being rounded and tapered), as the second barrel presses the ring member 16', the ring member 16' is inclined and lifted by the helicoid threads 15a'. Thus, with a relatively weak force, the ring member 16 may easily detach from the first movable barrel 14'.

Figure 8:
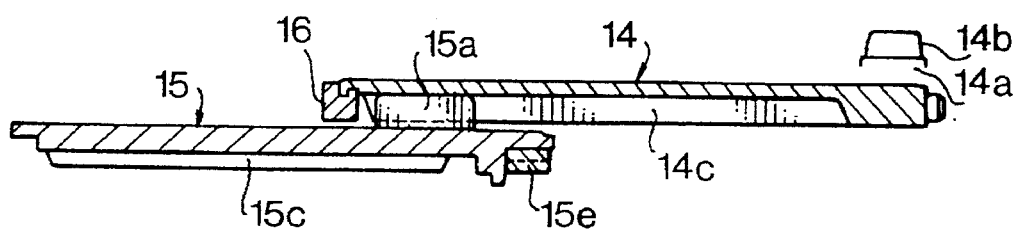
FIG. 8 shows the interaction of external helicoid threads with the ring member as the threads approach the ring, in a lens barrel embodying the invention.
Figure 9:
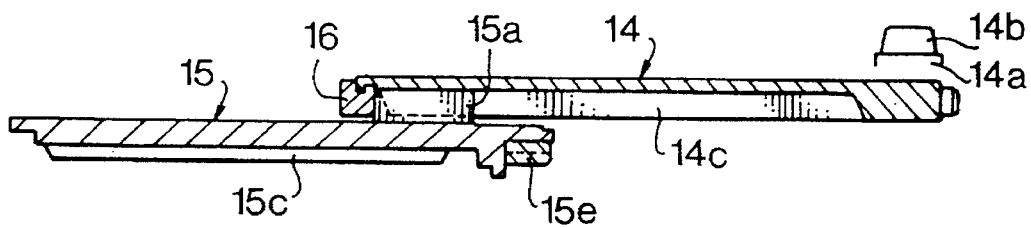
FIG. 9 shows the interaction of external helicoid threads with the ring member of a conventional lens barrel in a contact situation, in a lens barrel embodying the invention.

FIG. 8 shows the relationship between the external helicoid threads 15a and the ring member 16 at the designed maximum extension for a helicoid form according to the embodiment of the invention, and FIG. 9 shows the situation where the second movable barrel 15 overextends the designed maximum extension, and contacts the ring member 16.

According to the embodiment, when the second movable barrel 15 overextends the designed maximum extension, and contacts the ring member 16 (as shown in FIG. 9), all the surfaces S of the helicoid threads 15a contact the projected surface of the ring member simultaneously, and flat-faced contacting surfaces S are flush with the inner perpendicular surface of the ring member 16, and perpendicular to the optical axis (i.e., moving direction of the second movable barrel). Therefore, an inclining force is not applied to the ring member 16, and the ring member 16 is not easily detached under the force of the second movable barrel 15.

The present disclosure relates to subject matter contained in Japanese Patent Application No. HEI 06-176000, filed on Jul. 5, 1994, which is expressly incorporated herein by reference in its entirety.

What is claimed is:

1. A zoom lens barrel comprising:

an outer barrel, an object side of said outer barrel defined as a side facing an object to be photographed;

internal helicoid threading arranged on an inner surface of said outer barrel;

an inner barrel, said inner and outer barrels being concentric about an axis;

external helicoid threading arranged on an outer surface of said inner barrel, said external helicoid threading having a flat end face on an object side end, and said internal helicoid threading and said external helicoid threading being engaged to drive said inner barrel in a direction of said axis; and a flat-faced ring member attached within an object side end of said inner surface of said outer barrel, and having an inner flat face parallel to said flat end face on said object side end of said external helicoid threading.

2. The zoom lens barrel according to claim 1, wherein when said inner barrel is driven towards said object side such that said inner flat face of said flat-faced ring member contacts said flat end face on said object side end of said external helicoid threading, said inner flat face and said flat end face are in flush contact.

3. The zoom lens barrel according to claim 2, wherein said flat end face on said object side end of said external helicoid threading is formed perpendicular to said axis, and said inner flat face of said flat-faced ring member is formed perpendicular to said axis, so that all contact forces between said inner flat face and said flat end face are in said direction of said axis.

4. The zoom lens barrel according to claim 3, wherein said ring member has a groove formed in an outer circumferential surface, and said outer barrel has a ridge provided on an inner circumferential surface, and said ring member is attached to said outer barrel by fitting said groove to said ridge.

5. The zoom lens barrel according to claim 3, wherein a width of said external helicoid threading becomes narrower approaching said flat end face on said object side end of said external helicoid threading.

6. The zoom lens barrel according to claim 5, wherein said width of said external helicoid threading becomes narrower approaching said flat end face on said object side end of said external helicoid threading in a stepped fashion.

7. The zoom lens barrel according to claim 1, wherein said outer barrel is a first movable barrel of a telescoping zoom lens barrel integrally formed with a camera body, and said inner barrel is a second movable barrel fitted in said first movable barrel.

8. A zoom lens barrel comprising:

an outer barrel, an object side of said outer barrel defined as a side facing an object to be photographed;

internal helicoid threading arranged on an inner surface of said outer barrel;

an inner barrel, said inner and outer barrels being concentric about an axis;

external helicoid threading arranged on an outer surface of said inner barrel, said external helicoid threading having a flat end face on an object side end, said internal helicoid threading and said external helicoid threading being engaged to drive said inner barrel in a direction of said axis;

a flat-faced ring member attached within an object side end of said inner surface of said outer barrel, and having an inner flat face parallel to said flat end face on said object side end of said external helicoid threading;

said inner flat face of said flat-faced ring member and said flat end face on said object side end of said external helicoid threading being flush when in contact;

said flat end face on said object side end of said helicoid threading being perpendicular to said axis; and said inner flat face of said flat-faced ring member being perpendicular to said axis, wherein all contact forces between said inner flat face and said flat end face are in said direction of said axis.

9. The zoom lens barrel according to claim 8, wherein said ring member has a groove formed in an outer circumferential surface, said outer barrel has a ridge on an inner circumferential surface, and said ring member is attached to said outer barrel by fitting said groove to said ridge.

10. The zoom lens barrel according to claim 8, wherein a width of said external helicoid threading narrows approaching said flat end face on said object side end of said external helicoidal threading.

11. The zoom lens barrel according to claim 10, wherein said width of said external helicoid threading narrows approaching said flat end face on said object side end of said external helicoid threading in a stepped fashion.

12. The zoom lens barrel according to claim 8, wherein said outer barrel is a first movable barrel of a telescoping zoom lens barrel formed integrally with a camera body, and said inner barrel is a second movable barrel fitted in said first movable barrel.

13. A zoom lens barrel comprising:

an outer barrel, an object side of said outer barrel defined as a side facing an object to be photographed, internal helicoid threading provided on an inner surface of said outer barrel;

an inner barrel, said inner and outer barrels being concentric about an axis;

external helicoid threading provided on an outer surface of said inner barrel, said external helicoid threading having a flat end face on an object side end, said internal helicoid threading and said external helicoid threading being engaged to drive said inner barrel along a direction of said axis; and a flat-faced ring member attached at an object side to said outer barrel, said flat-faced ring member having an inner diameter smaller than an inner diameter of said outer barrel and larger than an outer diameter of said inner barrel, said flat-faced ring member having an inner surface facing inwardly towards said internal helicoid threading and said external helicoid threading, said inner surface being parallel to said flat end face on said object side end of said external helicoid threading.

14. The zoom lens barrel according to claim 13, wherein said ring member has a groove formed in an outer circumferential surface, said outer barrel has a ridge on an inner circumferential surface, and said ring member is attached to said outer barrel by fitting said groove to said ridge.

15. The zoom lens barrel according to claim 13, wherein a width of said external helicoid threading narrows approaching said flat end face on said object side end of said external helicoidal threading.

16. The zoom lens barrel according to claim 15, wherein said width of said external helicoid threading narrows approaching said flat end face on said object side end of said external helicoid threading in a stepped fashion.

17. The zoom lens barrel according to claim 13, wherein said outer barrel is a first movable barrel of a telescoping zoom lens barrel formed integrally with a camera body, and said inner barrel is a second movable barrel fitted in said first movable barrel.

* * * * *